May 26, 1959    W. A. FEIBELMAN ET AL    2,888,372
FREELY SUPPORTED RETINA
Filed June 4, 1957
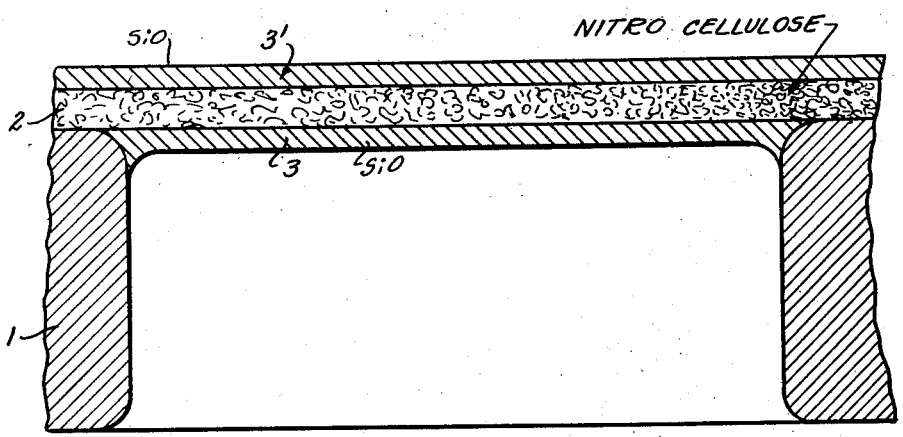
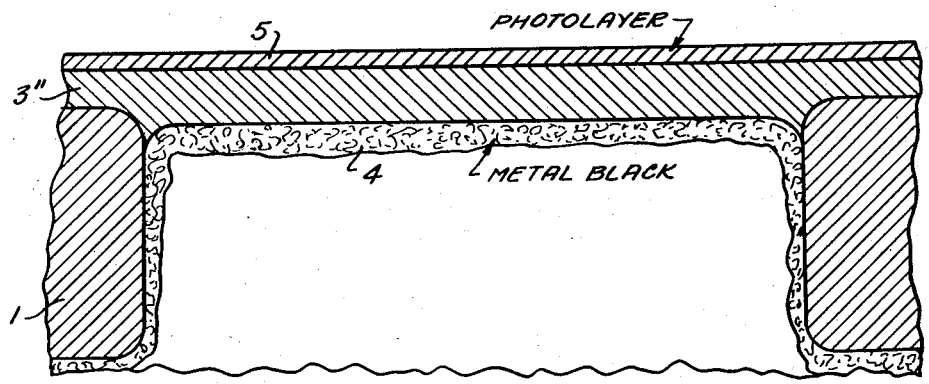
INVENTORS
WALTER A. FEIBELMAN
ROBERT C. OHLMANN
BY
ATTORNEYS

United States Patent Office 2,888,372
Patented May 26, 1959

2,888,372

FREELY SUPPORTED RETINA

Walter A. Feibelman, Pittsburgh, Pa., and Robert C. Ohlmann, Albany, Calif., assignors, by mesne assignments, to the United States of America as represented by the Secretary of the Air Force Application June 4, 1957, Serial No. 663,556

4 Claims. (Cl. 117—211)

This invention relates to a retina and more particularly to a large freely supported retina and to a method for its production.

As a background for imparting a clear understanding of the present invention as claimed, in the field of photo-thermionic image converters, thermal image converters and the like, thermal objects are detected by means of a temperature sensitive photoemission effect. The image of an object produces a temperature distribution on a sensitive surface which is then detected by means of the thermal coefficient of photoemission.

A brief summary of the invention follows indicating its nature and substance together with a statement of the object of the invention commensurate and consistent with the invention as claimed and also setting out the exact nature, the operation and the essence of the invention complete with proportions and techniques that are necessary with its use. The purpose of the invention also is stipulated. The presentation is adequate for any person who is skilled in the art and science to which the invention pertains to use it without involving extensive experimentation. The best mode of carrying out the invention is presented by the citing of a specific operative example inclusive of the preparation and the use of at least one example of the invention.

The purpose of this invention is to provide an improved retina having a rapid thermal response and sensitive to temperature variations of an object. The improved retina consists of an extremely thin film supported by a structure of minimized thermal capacity and heat conduction. The film supports a thermal radiation absorbing black material and supports a temperature sensitive photoemissive material.

In the development of the present invention a film of a suitable organic material, such as nitrocellulose or the like, was applied to the etched surface of a sheet of glass. The peak tips of the etched glass surface preferably are reduced in angularity and sharpness by decreasing concentration etches, as is practiced in fortifying etched glass to impart strength thereto. The glass was then placed within an evacuated, or a neutral gas filled compartment and a thin layer of silicon monoxide was deposited on the organic material film. The organic film was then baked out to provide a silicon monoxide layer supported by the peak tips of the etched glass surface. Subsequent layers were then evaporated on the silicon monoxide layer, such as a layer of metal black, of which gold black, is representative, another layer of silicon monoxide and finally a layer of a photoemissive material such as cesium-antimony, or the like. The resultant structure is an extremely thin film, resting or supported on points.

An object of the structure is to minimize thermal capacity and heat conduction. The metal black material so supported absorbs thermal radiation from objects and the energy so absorbed is imparted to the temperature sensitive photoemissive material.

The sharpness of the peak tips is reduced to minimize the tendency of the glass peaks to puncture the supporting film of silicon monoxide and thereby roughen the surface of the gold black, and also to permit increased thinness in the films so developed and supported. The areas of the glass peaks touching the silicon monoxide film are minimized to reduce the loss of thermal sensitivity and response due to heat conduction away from the thermal image. Each point of contact may cause some loss in resolution. The spaces between the tips of the glass peaks illustratively may average about .008 inch.

The object of the silicon monoxide layer evaporated over the metal black is the stabilization of the metal black and the presentation of a uniform layer of silicon monoxide beneath the photo layer. The layer of metal black is somewhat of a feathery nature, which may affect the continuity of the silicon monoxide layer against the metal black layer and beneath the photo layer. Preferably the metal black is deposited on one side of the silicon monoxide layer and the photo layer is deposited on the opposite side of the silicon monoxide layer. The thickness of the layer of silicon monoxide is minimized. The thermal sensitivity of the retina is limited by the relative masses of the support and of the films.

An object of this invention is to provide a new and a useful retina having a supporting film on one side of which is a layer of metal black and on the opposite side of which is a photo layer. The retina preferably is supported along the outside edge of its imaging area, for which reason it may be referred to as a self-supported or a freely supported retina.

An illustrative operative embodiment of the present invention is shown in the accompanying drawing, wherein:

Fig. 1 is an enlarged, fragmentary, transverse sectional view of a retina embodying the present invention in process of construction; and Fig. 2 is a corresponding sectional view of the retina in Fig. 1, in its completed state.

The frame 1 in the accompanying drawing may be made of metal, glass or other suitable material. Illustratively, the frame may be 1/32 inch to 1/16 inch in thickness and the inner orifice may be 2 inches in diameter.

An organic film 2 of nitrocellulose or the like, is formed on a water surface. The film 2 is lifted from the water surface and is caused to cover the orifice in the frame 1. The frame 1, with its orifice covered by the film 2, is then introduced into a suitable enclosure. The enclosure is evacuated, or it is filled with an inert gas, and silicon monoxide vapor is caused to deposit on preferably the opposite surfaces of the film 2, as the silicon monoxide films or layers 3 and 3', shown on Fig. 1 of the drawings.

The silicon monoxide layers 3 and 3' preferably are deposited from vapors applied to the frame supported film 2 through a desired number of time periods of one-half minute each, applied consecutively on opposite sides of the organic film 2, for the purpose of minimizing the wrinkling of the organic film 2 and the silicon monoxide layers 3 and 3'. The resultant organic film 2 and silicon monoxide layers 3 and 3', as an assembly structure, is strong and flat and preferably is but a fraction of a millimeter in thickness.

The resultant assembly structure is then baked in an evacuated oven maintained at about 300° C., during the vaporization and the removal of the nitrocellulose film 2 from between the silicon monoxide films 3 and 3' and during the merging of the silicon monoxide films 3 and 3' into the single silicon monoxide film 3" shown in Fig. 2 and firmly bonded throughout its periphery to the frame 1. The resultant silicon monoxide film 3" is freely supported by the frame 1 and is amply strong down to a thickness of 500 angstroms to offset breakage during the gentle handling of the frame 1.

In the process of baking out the nitro cellulose, at about 250° C. in air, the nitro cellulose begins to decompose by the process of pyrolysis, i.e., chemical decomposition under the influence of heat. During this process the individual molecules come off individually as vapor and the silicon monoxide gradually and without distortion settles down on the glass peaks. Since silicon monoxide does not evaporate below temperatures of at least 1750° C., it is entirely unaffected. Some of the nitro cellulose molecules also diffuse through the silicon monoxide film and then evaporate off the surface.

The nitro cellulose diffuses through and evaporates off the surfaces of the silicon monoxide and then evaporates. No traces of nitro cellulose are ever found after the bake-out process.

As the nitro cellulose disappears from between the two layers of silicon monoxide, these layers come in physical contact and by the process of molecular attraction become fused together into a single homogeneous film. It is impossible to separate the two layers afterwards.

The nitro cellulose is kept sufficiently distant, such as at 10 inches, from the hot filament used to evaporate silicon monoxide. Since the silicon monoxide settles one molecule after another in a gradual and gentle fashion, the nitro cellulose film is in no way distorted or destroyed.

The silicon monoxide film is inherently stronger than the nitro cellulose film, which serves merely as a support mechanism to obtain a flat, smooth silicon monoxide layer. A metal black film 4 is then evaporated and is deposited on one side of the silicon monoxide film 3''. A photo layer 5 of cesium-antimony or the like, is then deposited on the opposite side of the silicon monoxide film 3'', resulting in a structure such as that represented in Fig. 2 of the drawing.

The retina shown in Fig. 2 has as advantages a fast thermal response and an improved thermal sensitivity. The thin film sections retard heat loss away from the edges of an imaging area. The retina in Fig. 2 is approximately the same thickness as is the retina supported on glass peaks previously described. The glass peak supported retina has an experimentally determined time constant of $\frac{1}{45}$ second, which in no sense is a limitation. It will be apparent that for smaller image areas the thickness of the films may be decreased. The described retina has the advantage that the metal black layer 4 and the photo layer 5 are separated by the continuous supporting film 3''. Electrical conduction from the image area to the metal base will occur through the metal black 4, which may cause a voltage drop of less than one volt at $10^{-5}$ amperes. Electrical contact, where desired, may be made to the metal of the frame 1 without impairing the structure or the function of the films supported by the frame.

The freely supported thin film of silicon monoxide, which is described and defined herein, may find applications in image orthicon tubes and in related types of work, such as in secondary emission multiplication through films, in which supporting films may be applied to a fine mesh or the like. A freely supported thin film has the advantage of presenting a 100% open area, as compared with the lesser open areas of screens presently in use.

It will be apparent that the retina which is described herein and the described methods by which it may be made, are subject to modification in details and in materials and in method steps without departing from the spirit and the scope of the present invention.

What we claim is:

1. A retina consisting of an apertured frame, a silicon monoxide film covering the aperture in the frame, a metal black layer on one side of the silicon monoxide film, and a photo layer on the side of the silicon monoxide film remote from that bearing the metal black.

2. A retina comprising an apertured frame, a silicon monoxide film covering the aperture in the frame with the silicon monoxide film periphery secured to the frame, a gold black film covering one side of the silicon monoxide film, and a cesium-antimony photo layer covering the side of the silicon monoxide film remote from the gold black film.

3. The method of forming a retina, consisting of the steps of applying over an aperture in a frame a thin film of nitrocellulose, depositing a thin film of silicon monoxide over both opposite sides of the nitrocellulose film, applying heat to the structure for accomplishing the vaporization of the nitrocellulose film and the merging of the pair of silicon monoxide films into a single film covering the aperture in the frame, applying a metal black to one side of the silicon monoxide film covering the aperture in the frame, and applying a photo layer on the side of the silicon monoxide film remote from that side to which the metal black is applied.

4. The method of making a retina which consists of covering an aperture in a frame with a thin film of nitrocellulose, consecutively vaporizing for one-half minute intervals silicon monoxide on one side and then on the opposite side of the nitrocellulose film covering the aperture in the frame, baking out the nitrocellulose from between the pair of silicon monoxide films at the temperature of about 300° C. and causing the unification of the pair of silicon monoxide films into a single film covering the aperture in the frame, vaporizing gold black and causing its adherence in a continuous film on one side of the silicon monoxide single film covering the aperture in the frame, and vaporizing cesium-antimony and causing its adherence as a continuous film on the side of the silicon monoxide film remote from the gold black.

References Cited in the file of this patent

UNITED STATES PATENTS 2,739,084   Sommer _____ Mar. 20, 1956